United States Patent [19]
Lee

[11] Patent Number: 5,528,316
[45] Date of Patent: Jun. 18, 1996

[54] METHOD FOR SELECTING A TELEVISION TURN-ON TIME VOLUME LEVEL

[75] Inventor: San S. Lee, Suwon, Rep. of Korea

[73] Assignee: Samsung Electronics Co., Ltd., Kyungki-Do, Rep. of Korea

[21] Appl. No.: 202,581

[22] Filed: Feb. 28, 1994

[30] Foreign Application Priority Data

Feb. 26, 1993 [KR] Rep. of Korea .................. 93-2756

[51] Int. Cl.⁶ .................................................. H04N 5/60
[52] U.S. Cl. ................................ 348/725; 348/738
[58] Field of Search .......................... 348/730, 734, 348/738, 569, 729, 725, 6; H04N 5/63, 7/10, 5/44, 5/60, 5/46, 5/76

[56] References Cited

U.S. PATENT DOCUMENTS

| | | | |
|---|---|---|---|
| 4,641,205 | 2/1987 | Beyers, Jr. ................... | 360/33.1 |
| 4,843,384 | 6/1989 | Ide et al. ..................... | 340/825.69 |
| 4,963,994 | 10/1990 | Levine ........................ | 358/335 |
| 4,977,455 | 12/1990 | Young ......................... | 358/142 |
| 5,191,231 | 3/1993 | Berry .......................... | 348/730 |

OTHER PUBLICATIONS

JVC Service Manual 27" Color Monitor Receiver 1991/Jul.
JVC Instructions AV–2781S color Monitor Receiver Jul./1991.
Miyoshi "Television Receiver", Jan./1992.

*Primary Examiner*—James J. Groody
*Assistant Examiner*—N. N. West
*Attorney, Agent, or Firm*—Sughrue, Mion, Zinn, Macpeak & Seas

[57] ABSTRACT

The television sound volume to be achieved when a television is turned on by an on-time reservation function is preset into the system along with presetting the on-time of the television. The setting is accomplished using arrow keys and viewing an on-time reservation means on the television screen.

10 Claims, 2 Drawing Sheets

| - | TV/VIDEO | POWER | - |
|---|---|---|---|
| 1 | 2 | 3 | SOUND VOLUME ↑ |
| 4 | 5 | 6 | SOUND VOLUME ↓ |
| 7 | 8 | 9 | SOUND ERASE |
| CHANNEL ↓ | 0 | CHANNEL ↑ | PREVIOUS CHANNEL |
| ERASE | MEMORY | HELP | FINE TUNING ↑ |
| MODE ↓ | MODE ← | INDEX | FINE TUNING ↓ |
| MODE ↑ | MODE → | SCREEN CONTROL | CONFIRM |
| STANDARD SCREEN | STANDARD SOUND | CAPTION | FUNCTION SELECTION |

METHOD FOR SELECTING A TELEVISION TURN-ON TIME VOLUME LEVEL

BACKGROUND OF THE INVENTION

1. Field Of The Invention

The present invention relates to an on-time reservation (a programming of turn-on time of a television) function in a television, and more particularly to a volume programming method included in an on-time reservation function, wherein volume is programmed together with reservation of the turn-on time of a television to produce a desired volume level at the time of power-on of the television.

Korean Patent Application No. 93-2756 is incorporated herein by reference for all purposes.

2. Description Of The Prior Art

Typically, by programming the turn-on time of a television in accordance with an on-time reservation, the power to the television is turned on when a current time coincides with the programmed turn-on time.

The television stores the volume level existing at the time it is turned off, and when it is later turned on, the volume level will be set at that which was stored at the time of the power-off state.

An on-time reservation function is useful as a morning wake-up alarm, but the sound volume of the television may be too low to perform satisfactorily, the alarm function since the television may have last been watched during very late nighttime hours with the volume turned way down.

Accordingly, in order to secure a desired volume at the time of automatic turn-on of the television by the on-time reservation function, the television must be set to have a desired sound volume prior to being turned off. This is a problem because the viewer may forget to increase the sound before turning off the set at night, and, even if the viewer remembers to increase the volume late at night, the increased sound volume may disturb others.

Japanese Patent Laid-Open No. Hei. 4-51683, entitled "Timer-Setting method of a television receiver," describes a technique in which current time, time of a program timer and alphanumeric screen information for setting the turn-on/-off time of a timer are simultaneously displayed by an on-screen display (OSD) circuit on a cathode ray tube (CRT), and the respective times are set using the OSD circuit. That is, the screen of the television receiver is set to a timer-setting screen mode in which the alphanumeric information for setting the current time and the time of the timer is displayed using the OSD circuit in conjunction with the manipulation of a program key. At the same time, a time-setting mode of the timer for setting the time of the timer is primarily set when the current time is preset during manipulation of the program key, or a current time-setting mode for setting the current time is primarily set when the current time is not set during manipulation of the program key. Therefore, the index of setting the timers is displayed on a single screen to easily understand mutual time relationship of various timers, but the desired volume cannot be heard during power-on of the television by the on-time reserving function.

SUMMARY OF THE INVENTION

The present invention is designed to solve the above-described problems. Accordingly, it is an object of the present invention to provide a volume programming method for programming the volume during an on-time reservation function to produce the programmed volume at the time of power-on of a television, thereby satisfactorily performing an alarm function. Also, when the power of the television is turned on by the on-time reservation function, the desired volume is produced to be convenient to a user.

To achieve the above object of the present invention, a volume programming method for a television having an on-time reservation function comprises the steps of: setting current time, turn-on time and turn-off time of the television, and volume by means of arrow keys when a menu screen is displayed by pressing a key for the on-time reservation; comparing current time with the programmed turn-on time to check whether or not they are coincident with each other; determining whether the television is already turned on when the current time coincides with the turn-on time of the television; and ignoring the on-time reservation function when the television is already turned on, or turning on the power of the television, selecting a channel corresponding to the channel viewed at the time the television was last turned off, and producing the programmed volume.

BRIEF DESCRIPTION OF THE DRAWINGS

The above objects and other advantages of the present invention will become more apparent by reference to the following description of detail preferred embodiments thereof with reference to the attached drawings in which:

FIGS. 4A–4F show one embodiment of a volume programming sequence according to the present invention; and FIG. 5 is a flow chart of the volume programming method in the on-time reservation function according to the present invention.

DETAILED DESCRIPTION OF THE PREFERRED EMBODIMENTS

Figure 1:
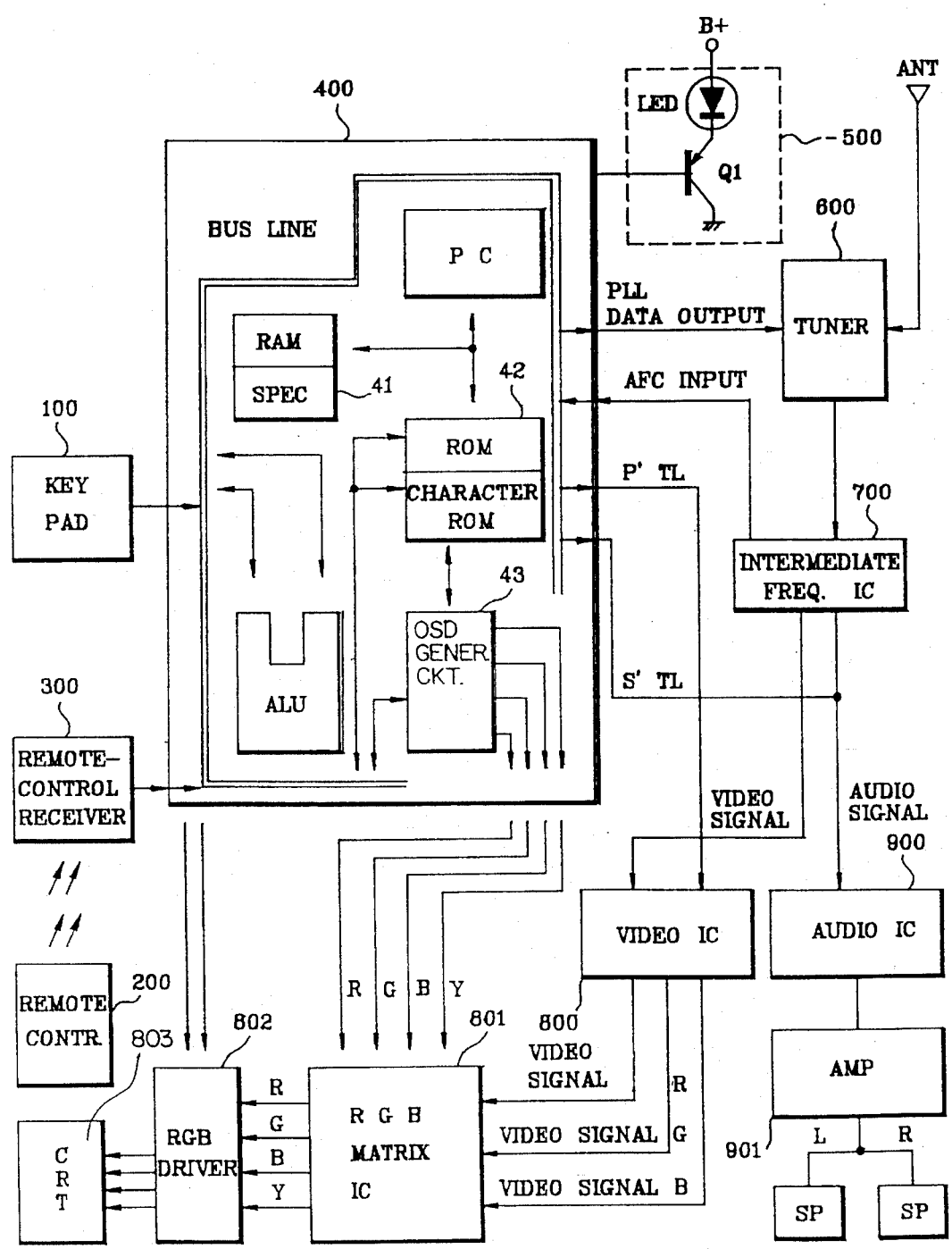
FIG. 1 is a block diagram schematically showing a circuit for programming a volume level in an on-time reservation function according to the present invention.

Referring to FIG. 1, there is shown a circuit for executing volume programming with an on-time reservation function, where a key pad 100 incorporated on the television and a remote controller 200 have keys for performing time setting and volume level programming in connection with an on-time reservation function, and a remote-control receiver 300 for receiving key input signals from the remote controller 200.

Additionally, a microcomputer 400 controls the overall system in accordance with a key signal from the key pad 100 or the remote-control receiver 300. A tuner 600 operates conventionally to select a radio frequency (RF) signal in accordance with a phase-locked loop (PLL) data output signal from the microcomputer 400 and to convert the selected RF signal (channel) into an intermediate frequency signal.

An intermediate frequency IC 700 amplifies the intermediate frequency signal from the tuner 600 and separates the signal into a video signal and an audio signal which are output therefrom. Circuit 700 also outputs an automatic frequency control signal to the microcomputer 400. The AFC signal automatically lowers the horizontal oscillating frequency of an oscillator (not shown) when the oscillating frequency thereof becomes higher than a horizontal synchronizing signal from a transmitting side, or automatically raises the horizontal oscillating frequency when the latter is lower than the horizontal synchronizing signal, thereby constantly and accurately performing horizontal synchronization.

A video IC 800 receives the video signal from the intermediate frequency IC 700 and video control signals P'TL from the microcomputer 400 to separate them into RGB signals. An audio IC 900 receives the audio signals from the intermediate frequency IC 700 and audio control signals S'TL from the microcomputer 400 for amplifying them in an amplifier 901, and the result of the amplification is externally output via speakers SP.

Here, the video control signals P'TL control the contrast, brightness, color, tint, sharpness, etc., and the audio control signals S'TL control the volume, bass, treble, balance, etc., all of which is well known in the television art.

The microcomputer 400 has a RAM for temporarily storing data, a spec 41 for storing a feedback address when the microcomputer 400 processes subroutines, a ROM for storing a program executed by the microcomputer 400, and a character ROM 42 for storing character font data for displaying characters such as a selected channel number and volume control status on a screen, e.g., CRT 803, of the television. Moreover, an on-screen display (OSD) generating circuit 43 reads out the character font data to be displayed on the television from the character ROM 42 and separates the read out data into color signals R,G and B and a lumina signal Y and outputs the separated signals. An arithmetic logic unit carries out operations in accordance with the command of the microcomputer 400 by reading out the information stored on the RAM, and a program counter stores an address of a command in the memory to be executed later and sequentially reads out the stored command from the memory while increasing the address in increments of one.

Furthermore, an RGB matrix IC 801 mixes and outputs the color signals RGB and lumina signals Y from the video IC 800 and the OSD generating circuit 43 from the microcomputer 400, and an RGB driver 802 receives the color signals R, G and B and the lumina signals Y from the RGB matrix IC 801 and applies them to a conventional CRT 803 television screen.

Also, the microcomputer 400 is connected to a display circuit 500 which is formed of a transistor Q1 having a base connected to the microcomputer 400, and a light-emitting diode (LED) connected between an emitter of the transistor Q1 and a power supply voltage +B.

Figures 2, 3:
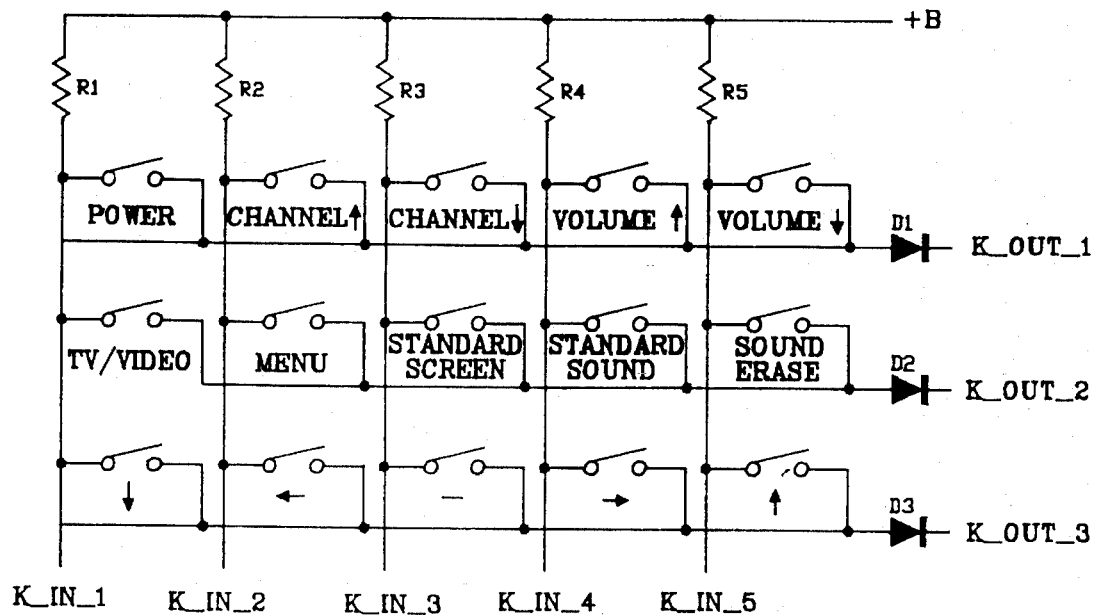
FIG. 2 shows the construction of the key pad shown generally in FIG. 1.
FIG. 3 shows the construction of the remote controller shown generally in FIG. 1.

FIG. 2 shows one embodiment of the construction of the key pad 100 in FIG. 1, and FIG. 3 shows one embodiment of the construction of the remote controller 200 in FIG. 1, wherein the on-time reservation can be executed by means of a selected key, e.g., an index key or an arrow key.

FIGS. 4A–4B show the screen status of the television in one embodiment of the on-time reservation and volume level programming process when the index signal is input through the key pad 100 or the remote controller 200. FIG. 4A shows a menu screen displayed as a result of the index signal generated by one of the key pad 100 or remote controller 200, and FIG. 4B shows one example of the setting of current time on the menu screen of FIG. 4A.

FIG. 4C shows an example of the setting of the turn-on time of the television on the menu screen. FIG. 4D shows one example of the setting of the volume level to be achieved at turn-on time. FIG. 4E shows one example of the setting of the turn-off time for the television. FIG. 4F shows one example of the display of the volume level on CRT 803 using the OSD generating circuit 43 during the power-on of the television or as a result of an input of a volume up/down key on one of the key pad 100 or on the remote control device 200.

All entries, such as current time, turn-on time, etc., are made by pressing the appropriate number or arrow keys on the key pad 100 or on the remote control device 200.

FIG. 5 is a flow chart of the method for performing volume level programming as part of the on-time reservation function according to the present invention. In step 501, the current time, turn-on/-off time of the television, and volume at turn-on time are set by means of the key pad 100 or the remote controller 200. At step 502, the microcomputer compares the current time with the turn-on time and determines whether or not they are the same. If they are not the same, the program ends. If they are the same, then in step 503 the microcomputer determines whether the timer is on or not. If the timer is not on, the program ends. If the timer is on in step 504, the microcomputer determines whether or not the television is turned on. If the television is turned on, the on-time reservation is ignored and the program ends. If the television is off in step 505, the power of the television is turned on, the volume selected is that set in step 501, the channel selected is the last channel viewed at the time of power-off the television, the channel number is displayed on the CRT 803 using the OSD generating circuit 43, and the LED in circuit 500 is caused to flicker for a predetermined brief period of time and be turned on thereafter.

According to the present invention as above, the key pad 100 on the television and the remote controller 200 advantageously can be used for the time setting and volume level setting for the on-time reservation function. The signal from the remote controller 200 is supplied to the microcomputer 400 through the remote-control receiver 300.

The tuner 600 operates in a conventional manner in response to the PLL data from the microcomputer 400 to select the appropriate channel and to convert the selected RF channel frequency into an intermediate frequency, thereby supplying the intermediate frequency to the intermediate frequency IC 700.

The intermediate frequency IC 700 then amplifies the intermediate frequency from the tuner 600, separates the amplified intermediate frequency into the video signal and the audio signal to supply the video signal to the video IC 800 and the audio signal to the audio IC 900.

Also, the intermediate frequency IC 700 supplies the AFC signal to the microcomputer 400 for automatically lowering the horizontal oscillating frequency when the oscillating frequency from the horizontal oscillating circuit becomes higher than the horizontal sync signal from the transmitting side, or automatically raises the horizontal oscillating frequency to allow the horizontal synchronization to be constantly performed.

The video IC 800 separates RGB signals from the video signal supplied to its input side to supply them to the RGB matrix IC 801, and the audio IC 900 amplifies the audio signal supplied to its input side in the amplifier 901 and externally supplies the amplified signal via the speakers SP.

At this time, the microcomputer 400 supplies the video control signal P'TL to the video IC 800 to control the contrast, brightness, color, tint, sharpness, etc., and outputs the audio control signal S'TL to the audio IC 900 to control the volume, bass, treble, balance, etc., all in a conventional manner.

Meanwhile, if the RGB color signals and lumina signal Y, representing character data from OSD generating circuit 43 of microcomputer 400, are supplied to the RGB matrix IC 801, they are mixed with the RGB signals from the video IC 800 to display the result of the mixing on the cathode ray tube display screen 803 via the RGB driver 802.

The microcomputer 400 supplies a low signal to the base of the transistor in circuit 500 to turn on the LED when the timer is turned on, or supplies a high signal to turn off the LED when the timer is turned off. If the television power is turned on by on-time reservation function, the transistor Q1 is turned on and off in 0.5 second intervals for a predetermined period, e.g., 10 seconds, under the control of the microcomputer 400, thereby causing the LED to flicker.

The volume level programming process by on-time will be described in detail with reference to FIGS. 4 and 5.

To initiate on-time programming, the operator presses the appropriate key, e.g., index key of the key pad 100 or the remote controller 200, thereby causing a display of the menu screen as shown in FIG. 4A. Using the arrow keys →, ←, ↑, ↓, the current time is set as shown in FIG. 4B, and the turn-on time of the television is programmed as shown in FIG. 4C.

As shown in FIG. 4D, the volume level to be achieved at the time of turning on the television is keyed in. At this time, the programmed volume level may be the same as the main volume level. For the convenience of the user, a default value of the volume is set at a fixed level, e.g., $30/100$. Thus, if the volume level is not programmed, the volume level upon power-on of the television by the on-time reservation function becomes the default value.

After programming the turn-off time of the television as shown in FIG. 4E, the on-time function is activated. When the key for actuating the on-time function is activated, the microcomputer 400 supplies a low level signal to the transistor Q1 of the display circuit 500 to turn on the LED.

Thereafter, the current time is compared with the turn-on time that was set at step 501 to determine if the times are coincident. Steps 502–505 proceed as previously described.

If the television is determined to be off in step 504, step 505 is carried out to turn on the power of the television under the control of the microcomputer 400, the volume is provided at the programmed volume level, and the volume level is displayed on the screen by means of the OSD function, i.e., using OSD generating circuit 43, as shown in FIG. 4F.

Here, the volume level is identical to the main volume level. Once the volume is determined by the on-time reservation function and the television is turned on by on-time function, the volume maintains the programmed volume until one of volume up/down key is manipulated to adjust the volume.

Moreover, the microcomputer 400 stores the last channel at the time of power-off of the television to select the corresponding channel, displays the channel number on the screen using the OSD generating circuit 43, function, and flashes the LED for approximately 10 seconds at on/off intervals of 0.5 seconds.

According to the volume programming method as described above, the volume can be programmed together with programming the turn-on time of the television.

While the present invention has been particularly shown and described with reference to particular embodiments thereof, it will be understood by those skilled in the art that various changes in form and details may be effected therein without departing from the spirit and scope of the invention as defined by the appended claims.

I claim:

1. A method of selecting a sound volume level at a turn-on time, in a television system having an on-time reservation function, a key entry device with arrow keys, and an on-time menu displayed on a screen of the television, said method comprising the steps of:

setting current time, turn-on time and turn-off time of said television and volume level by means of arrow keys when said on-time menu screen is displayed by a user pressing a key for said on-time reservation, wherein said volume level corresponds to the television volume at the turn-on time;

comparing current time with said set turn-on time of said television to determine whether or not they are coincident with each other;

determining whether or not said television is already turned on when said current time is coincident with said turn-on time of said television; and if said television is determined in the preceding step to not having been already turned on, automatically turning on the power of said television, automatically selecting the last channel viewed at the time the television was last turned off and automatically adjusting the sound volume to the set volume level.

2. The method of claim 1, further comprising the step of providing an indication that the television was automatically turned-on when the step of automatically turning on the power of said television takes place.

3. A method of selecting a sound volume level at a turn-on time, in a television system having an on-time reservation function, a key entry device with arrow keys, and an on-time menu displayed on a screen of the television, said method comprising the steps of:

(a) setting current time, turn-on time and turn-off time of said television and volume level of the television at turn-on time;

(b) comparing current time with said set turn-on time of said television to determine whether or not they are coincident with each other;

(c) when said current time is coincident with said turn-on time determining whether or not said television is already turned on; and (d) when said television is off in said step (c), automatically turning on the power of said television, automatically selecting the last channel viewed at the time the television was last turned off and automatically adjusting the sound volume to the set volume level.

4. The method of claim 3, further comprising the step of providing an indication that the television is automatically turned-on when said step (d) is initiated.

5. The method of claim 2, wherein said indication is a flickering indication for a predetermined amount of time.

6. The method of claim 5, wherein an LED provides said flickering indication.

7. The method of claim 4, wherein said indication is a flickering indication for a predetermined amount of time.

8. The method of claim 7, wherein an LED provides said flickering indication.

9. The method of claim 1, wherein said the volume level is set to an arbitrary level by the user via the arrow keys.

10. The method of claim 3, wherein said the volume level is set to an arbitrary level by a user.

* * * * *